United States Patent [19]
Newsom

[11] Patent Number: 4,638,924
[45] Date of Patent: Jan. 27, 1987

[54] SELF MIXING SPRAYER

[76] Inventor: Horace R. Newsom, 5514 Cypress Ct., Midland, Tex. 79707

[21] Appl. No.: 664,234

[22] Filed: Oct. 24, 1984

[51] Int. Cl.⁴ .................. G05D 11/03; F16K 11/07
[52] U.S. Cl. .................................. 222/1; 222/52; 222/145; 222/249; 222/255; 222/335; 137/99; 137/106; 137/596.12; 137/625.68; 239/127
[58] Field of Search .................. 222/52, 56, 135, 145, 222/249, 255, 263, 334, 335, 1; 137/99, 106, 596.12, 625.68; 91/420; 239/127

[56] References Cited
U.S. PATENT DOCUMENTS

| | | | |
|---|---|---|---|
| 2,711,717 | 6/1955 | Stacey | 137/625.68 X |
| 2,887,094 | 5/1959 | Krukemeier | 137/99 X |
| 3,076,476 | 2/1963 | Campbell | 137/625.68 |
| 3,530,873 | 9/1970 | Arp et al. | 222/335 X |
| 3,776,252 | 12/1973 | Wilcox | 137/99 |
| 3,958,724 | 5/1976 | Ordway | 239/127 X |
| 4,390,035 | 6/1983 | Hill | 222/132 X |
| 4,392,508 | 7/1983 | Switall | 137/99 |
| 4,529,000 | 7/1985 | Funk | 137/99 |

FOREIGN PATENT DOCUMENTS 2353220  5/1975  Fed. Rep. of Germany ........ 137/99

Primary Examiner—H. Grant Skaggs
Assistant Examiner—Frederick R. Handren
Attorney, Agent, or Firm—Wendell Coffee; Montgomery W. Smith

[57] ABSTRACT

A sprayer mixes water and concentrate on an "as-used" basis. A preselected amount of concentrate is dispensed into a mix tank for each reciprocation of a proportioning pump set. The amount of concentrate dispensed is selected by varying the pump set stroke. The pump set is reciprocated by reversing flow into one power line and out of another power line fluidly connected to the set. The flow is reversed by sliding a spool within a bore from one position, where sets of apertures in the spool are aligned with ports of the bore to connect a source of water under pressure to one power line and the other power line to an outlet line leading to the mix tank, to another position, where the aperture sets are realigned with the ports to reverse the connections. A meter measures the flow of water to the mix tank. The meter connects current to open one of two control valves connecting the bore ends with the source to move the spool to its next position hydraulically. The meter switches current from one control valve to the other when a unit amount of water flows to the mix tank. The amount of concentrate dispensed for each reciprocation is in a desired mixture proportion to two unit amounts of water. A high pressure pump pressurizes mixture from the mix tank, which is discharged through a spray gun, or recycled in part to the mix tank to agitate the mixture therein.

17 Claims, 7 Drawing Figures

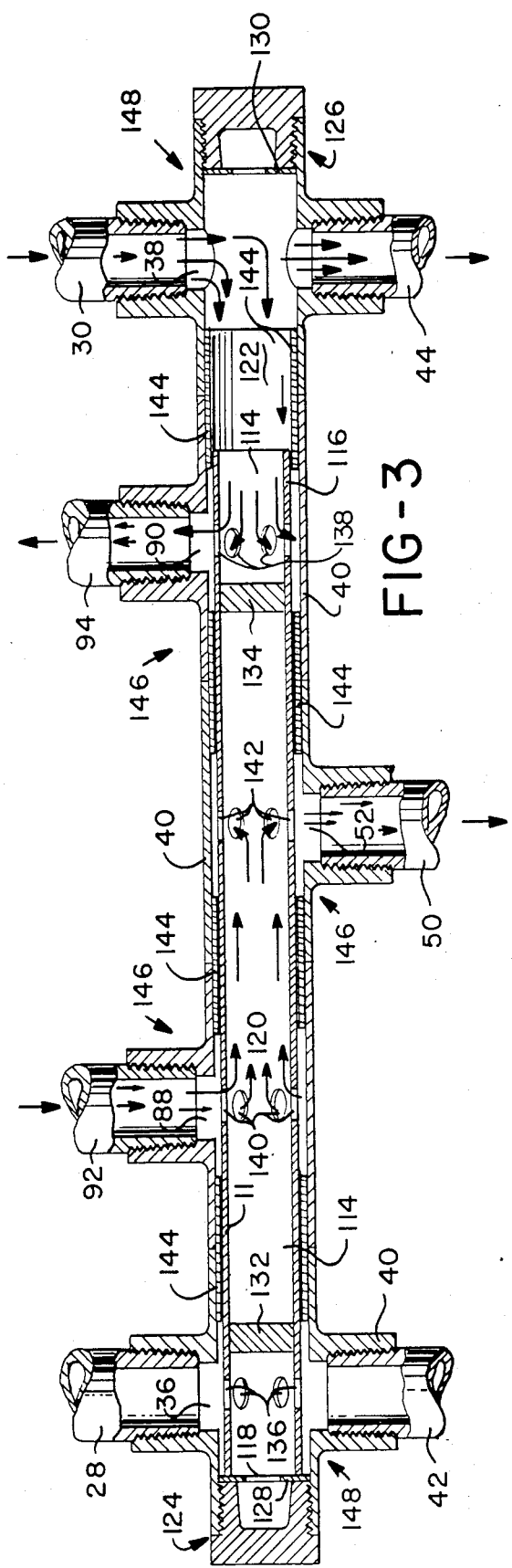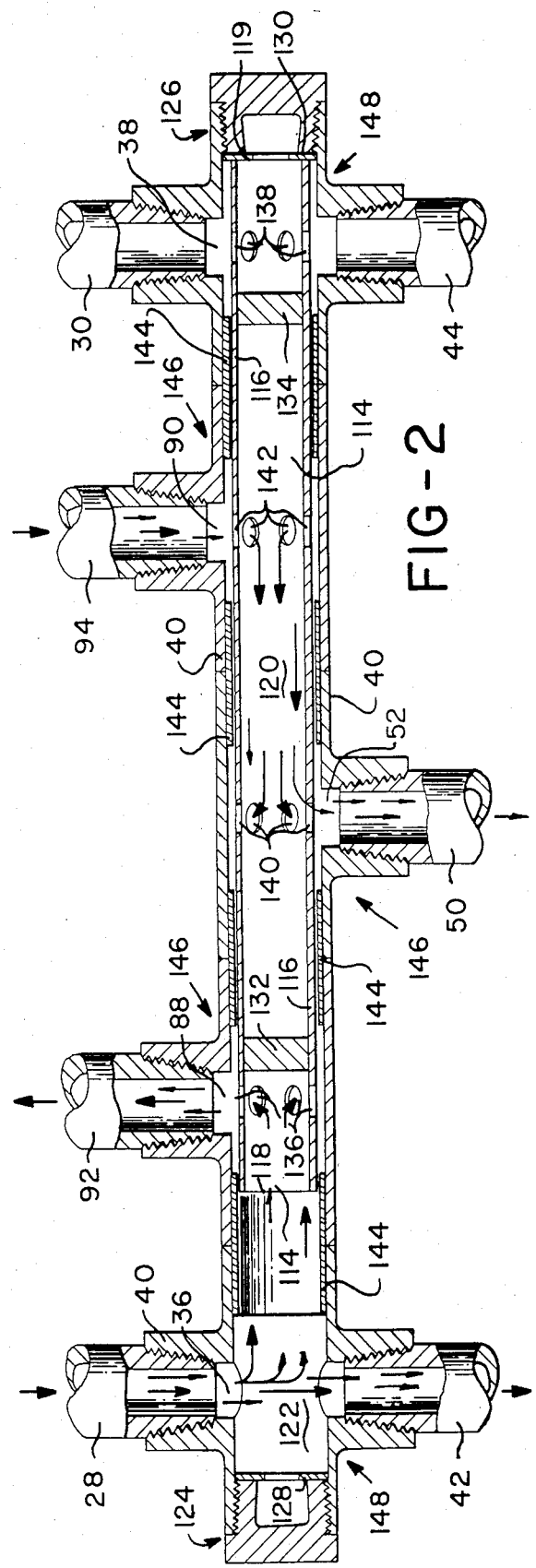

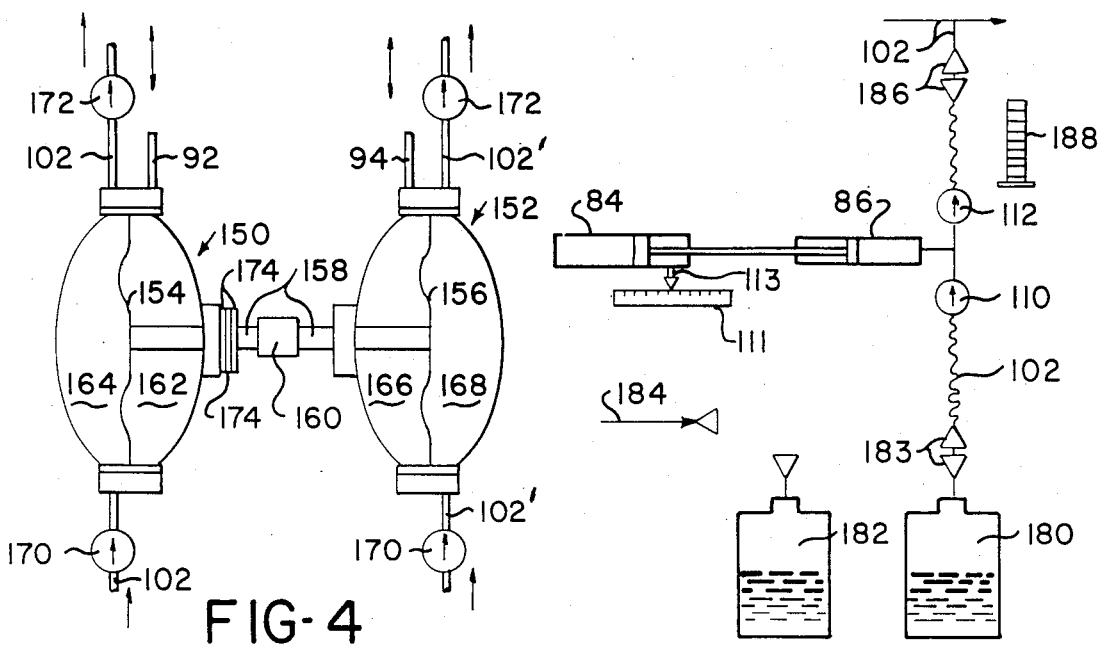
FIG-4
FIG-5
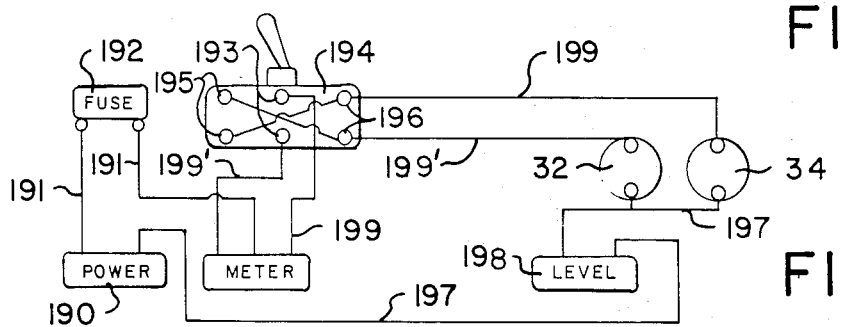
FIG-6
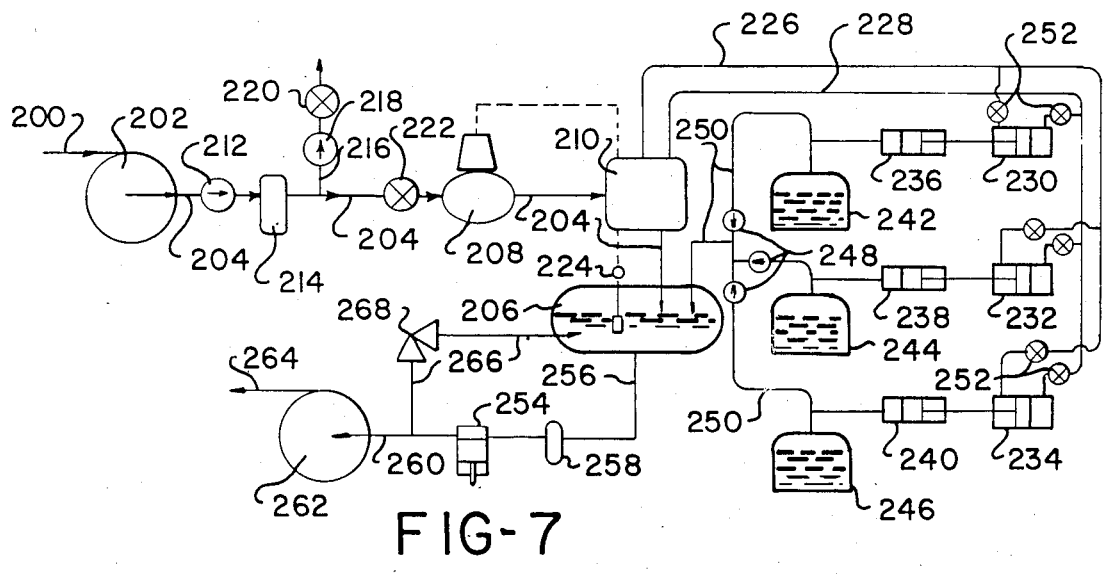
FIG-7

SELF MIXING SPRAYER

BACKGROUND OF THE INVENTION (1) Field of the Invention

This invention relates to spraying water solutions.

(2) Description of the Prior Art

Persons in the turf, shrub, and tree care business, and those rendering some pest control services, have typically used the premix or batch mix process when spraying solutions or slurries of concentrated insecticide, pesticide, or fertilizer diluted in water. The usual practice is to either premix an amount of the water and concentrate sufficiently large to do the job and then transport it to the spray site, or make up a large batch of mixture at the spray site each time more mixture is required.

The premix or batch methods created several problems. Frequently more mixture was made up than could be used, wasting the concentrates in the leftover mixture and creating a disposal problem. Inaccurate measurement of water and concentrate often yielded inconsistent concentrations. At times, the mixture premixed at the sprayer's place of business would be found to be the wrong mixture upon arrival at the spray site. Additionally, the batch mix and premix methods require considerable time which might be more profitably spent spraying.

Applicant is aware of the following U.S. Patent:
HILL, U.S. Pat. No. 4,390,035
Applicant cites this reference because he believes the Examiner might find it relevant and pertinent to the examination of this application. Although HILL does not disclose applicant's invention, it is an example of the prior art.

SUMMARY OF THE INVENTION (1) New Function and Surprising Results

I have solved the problems associated with the typical premix or batch mix procedures for spraying mixtures. A sprayer according to my invention is preferably made of inexpensive and easily readily standard PVC or other plastic pipe parts, and uses a source of water under pressure, at the spray site. My invention mixes the water with concentrate on an "as-used" basis, thereby avoiding the waste or disposal problems noted above. Mixing "as-used" also prevents making up the wrong mixture and avoids waste of time in batch preparation.

A sprayer according to my invention flows water from a source of water under pressure at the spray site to a mix tank. One of four chambers of a set of two proportioning pumps is connected to a concentrate line leading from a concentrate container to the mix tank. One stroke of the pump set withdraws a preselected amount of concentrate. A reciprocal stroke dispenses the withdrawn concentrate into the mix tank.

The proportioning pumps are reciprocated by fluidly connecting one chamber of the pump set to the source of water and an other chamber to the mix tank through power lines connected at flow ports of a shuttle device, and then operating the shuttle device to reverse these fluid connections after a unit amount of water was flowed to the mix tank.

The shuttle device is operated by opening a control valve in one of two control lines fluidly connecting the source of water to ends, or input ports, of the shuttle device. The control valves are alternately opened by a meter that measures the amount of water flowed to the mix tank. The meter switches the closed valve open and the previously open valve closed when the meter measures the flow of a unit amount of water to the mix tank. Thus, the pump set is reciprocated once for each two unit amounts of water flowed to the mix tank.

The shuttle device according to my invention preferably includes a tubular spool slidably telescoped within a shuttle bore of a shuttle body. The inlet ports are preferably at each end of the shuttle body, fluidly connected to the shuttle bore. A bore of the spool has spaced apart plugs therein near each end, so that when water pressure is connected to one end of the shuttle bore, through the inlet port, the hydraulic pressure will force the spool against a stop at the shuttle bore end.

Apertures through the spool wall are preferably positioned in sets, so that when the spool is against one stop, the apertures are appropriately aligned with the flow and outlet ports in the shuttle body spaced between the inlet ports. The outlet port is fluidly connected to the mix tank.

It is preferred that all of the aperture sets be spaced apart a shuttle stroke. The space or distance between the two stops is preferably the sum of the length of the spool and a shuttle stroke. This spacing results in the aperture sets each being aligned with the appropriate ports when the spool is abutted against either stop. Likewise, the input and flow ports are preferably spaced apart a shuttle stroke to accommodate the spacing of the aperture sets and stops.

Because the stroke of the proportioning pump set is independent of the amount of water actually flowed to the mix tank, my invention permits the selection of a different concentrate dispensed amount and water flow unit amounts, thereby providing a broad range of selectable, accurately measured mixture concentrations.

The structure of my invention permits construction of a sprayer using inexpensive, off-the-shelf items. The separate proportioning pumps and this arrangement facilitates adaptation of my invention to accommodate unique spraying applications.

Thus, it may be seen that the total combination far exceeds the sum of the functions of the individual elements such as pipes, pistons, valves, tanks, pumps, etc.

(2) Objects of this Invention

An object of this invention is the accurate combination of a preselected amount of water and other substances.

Another object of this invention is the spraying of a water diluted concentrate.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate, and maintain.

Other objects are to achieve the above with a method that is versatile, ecologically compatible, energy conserving, rapid, efficient, and inexpensive, and does not require highly skilled people to install, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 2 is a section view of a shuttle device according to my invention with the spool abutted against a stop.

FIG. 3 is a section view of the device shown in FIG. 2, with the spool position reversed.

FIG. 4 is an alternate proportioning system embodiment using diaphragm pumps.

FIG. 5 is an embodiment of a proportioning system reservoir connection.

FIG. 6 is a schematic diagram of the electrical control circuit for the spray system shown in FIG. 1, with an alternate level control embodiment.

FIG. 7 is a schematic diagram of an other second embodiment of my invention showing multiple proportioning systems and concentrate reservoirs.

DESCRIPTION OF THE PREFERRED EMBODIMENTS

Figure 1:
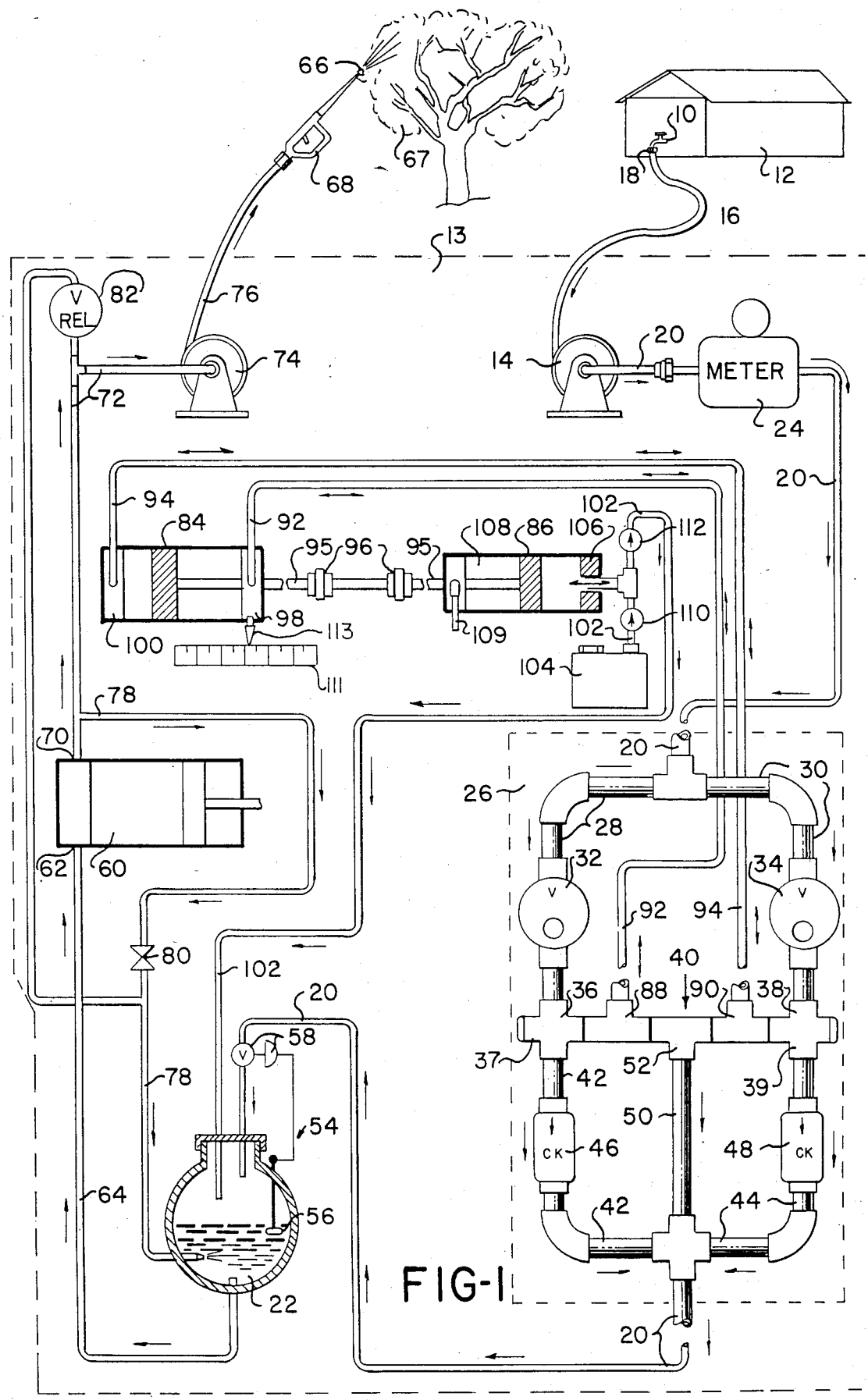
FIG. 1 is a schematic diagram of a spray system according to my invention, showing the preferred shuttle structure.

Referring to FIG. 1, a source of water under pressure at the spray site is preferably in the form of water faucet 10 at house 12. The faucet 10 provides a connection to a municipal or other water supply with a preferred pressure of at least 15 PSI gauge.

A tank (not shown) may be used as a source of water when a better source, such as a large irrigation pool, is unavailable at the spray site. The pump (not shown) would be used to provide the necessary minimum pressure of aout 15-16 PSI gauge. As used herein, the term "water" includes water containing additives or impurities, such as lubricants, emulsifiers, anticorrosive agents, minerals, salts, bacteria, and other purposely added or unknown substances other than pure water.

The source of water 10 is preferably connected to sprayer system or structure 13, shown by dashed lines around the structure below the house 12, at a water connector preferably in the form of hose reel 14, hose 16, and faucet connector 18. Water inlet line 20 fluidly connects the connector at hose reel 14 to mix tank 22. Meter 24 is fluidly connected in the water inlet line 20. The water input line 20 would include the necessary filter screens, relief and check valves, and the like common to the art.

Shuttle structure 26, shown by dashed lines in FIG. 1, is fluidly connected in the water inlet line 20. The water inlet line 20 is fluidly connected through two control lines 28 and 30 to ends of the shuttle device. Electrically actuated, normally closed, control valves 32 and 34 are in the control lines 28 and 30, respectively.

The control lines 28 and 30 are fluidly connected to input ports 36 and 38 of shuttle body 40 at the shuttle device ends. The shuttle body is part of and encases the other structure of the shuttle device. Bypass lines 42 and 44 preferably connect the control lines 28 and 30 respectively, to the water inlet line 20 leading to the mix tank 22. Bypass valves 46 and 48 in the bypass lines 42 and 44, respectively, are preferably back pressure, check type valves. The bypass valves prevent back flow from the line leading to the mix tank, and maintain a minimum pressure upstream in the shuttle body 40.

Outlet line 50 is preferably fluidly conected at one end to the water inlet line 20 leading to the mix tank and at its other end to outlet port 52 of the shuttle body. As will be more fully described later, water flows through the shuttle body to the mix tank. However, this flow, used to power the proportioning pumps, is usually insufficient to accommodate desired spray rates. Therefore, much of the water entering the mix tank flows through the bypass lines and valves.

I prefer to include level control 54 connected to the mix tank for controlling the level, or quantity, of mixture in the mix tank. The level control 54 preferably includes a float means for measuring the amount of mixture in the mix tank, in the form of adjustable float device 56 connected to the tank as schematically shown in FIG. 1. The float device 56 includes a microswitch (not shown) that is closed when the maximum preset level is exceeded. The switch is electrically connected to an electrically operated level valve 58 of the level control 54 in the water inlet line 20. When closed, the valve 58 blocks water flow from the source into the tank, shutting down the proportioning system as long as the microswitch on the float device connects current to the valve 58.

High pressure pump 60 is fluidly connected at inlet 62 to the mix tank 22 by tank line 64. The high pressure pump 60 pressurizes the mixture for discharge under high pressure through nozzle 66 of spray gun 68, fluidly connected to outlet 70 of the high pressure pump 60 by gun line 72, hose reel 74, and gun hose 76. The pressure created by the high pressure pump may be as high as 800-1000 PSI gauge for spraying the tallest limbs and branches of trees, such as tree 67 (FIG. 1).

It is sometimes necessary to agitate the mixture in the mix tank to maintain a somewhat uniform consistency and proportion of the mixture being withdrawn by the high pressure pump. Although paddles, propellers, recirculating pumps, and other mixing devices could be used to agitate the mixture in the mix tank, I prefer to recycle part of the pressurized mixture stream from the outlet of the high pressure pump through recycle line 78 to the mix tank. Recycle disconnect 80 in the recycle line 78 allows the agitation to be stopped. For safety, the gun line 72 includes pressure relief valve 82 which is fluidly connected to mix tank 22 in the manner as shown in FIG. 1 which will also assist in the agitation of mix tank 22 and will, of course, save any mix for further use.

The proportioning system includes a set of two proportioning pumps 84 and 86. The pumps 84 and 86 of this embodiment, as schematically shown in FIG. 1, are piston type pumps, where pump 84 acts as a motor, and pump 86 as a liquid pump. The pistons of the pumps 84 and 86 are described herein as pressure members segregating two pump sides or chambers of each pump. The pressure members, or pistons, are moved by hydraulic pressure. As will be discussed later, other type pumps and flow connections could be employed.

The pistons of the proportioning pumps 84 and 86 are preferably semirigidly connected by somewhat flexible shafts 95, connected at shaft coupler 96. The coupled shafts 95 form a connection of the pressure members such that reciprocation of one pressure member will reciprocate the other member. The piston of the pump 84 is reciprocated by alternating flow of pressurized water through the power lines 92 and 94, to pump sides, or chambers, 98 and 100, respectively. The power line 92 or 94 and the pump side 98 or 100 that is not connected to the source water pressure is fluidly connected to the mix tank through the shuttle body, as described later. The fluid connections of the pump 84 at the flow ports 88 and 90, to either the source or the mix tank, are referred to herein as the power fluid connections.

The proportioning system also includes concentrate line 102, fluidly connecting a concentrate reservoir or container 104 with concentrates therein to the mix tank 22. As schematically shown in FIG. 1, I prefer to discharge the concentrate directly into the mix tank instead of mixing it with the water in the water inlet line 20. However, it will be understood that the water inlet line could form a portion of the fluid connection of the reservoir 104 to the mix tank.

The pump 86 is fluidly connected at a concentrate side or chamber 106 to the concentrate line 102. For this embodiment, pump side 108 is vented to the atmosphere by vent 109. Upstream check valve 110 in the concentrate line 102 between the reservoir and pump side 106 permits flow from the reservoir into the proportioning pump 86 but not therefrom into the reservoir.

Thus, when hydraulic pressure, fluidly connected from the source water pressure to the pump side 98, moves the pump 86 piston to increase the volume in the side of chamber 106, suction will be placed on the concentrate in the container 104, which will be withdrawn into the chamber.

Downstream check valve 112 in the concentrate line between the mix tank and the pump 86 permits flow from the pump 86 to the mix tank, but not the reverse. Thus when the pump 86 piston is moved by the alternate connection of the pump side 100 to hydraulic pressure, the shafts 95 will move a reciprocal dispensing stroke opposite the withdrawal stroke. The consequent decrease in volume of the pump chamber 106 will exert force on the concentrate with the piston, or pressure surface, to force concentrate previously withdrawn into the pump 86 into the concentrate line 102 through the valve 110 and into the mix tank.

The pump 84 is preferably slidably mounted on a track connected to the pump 86 to provide stroke adjustment means for varying the proportioning stroke by changing the distance between the pumps 84 and 86 without changing the length of the shafts 95 and coupler 96. Volumetric scale 111, preferably mounted on the track, and pointer 113, preferably mounted on the pump 84, provide selector means for preselecting the amount of concentrate dispensed by each reciprocation of the pump set. The preferred method for calibrating the scale and pointer will be described later. Other structures for varying the pump 86 stroke, and for preselecting the stroke that will dispense the desired amount of concentrate could be used and still be within the scope of my invention.

FIGS. 2 and 3 show the preferred structure of a shuttle device 31 according to my invention. Shuttle spool 114 is preferably a small diameter PVC pipe having a length, spool walls 116, spool ends 118 and 119, and spool bore 120. The shuttle body 40 has a length, shuttle bore 122, and shuttle ends 124 and 126. The power lines 92 and 94 are fluidly connected to the shuttle bore through the flow ports 88 and 90. The shuttle bore is fluidly connected to the outlet line 50 through the outlet port 52. The shuttle end 124 connects the shuttle bore 122 to the control line 28 and bypass line 42, through the inlet port 36. The shuttle end 126 connects the shuttle bore 122 to the control line 30 and the bypass line 44 through the inlet port 38 and bypass port 39.

The shuttle bore 122 has stops 128 and 130 therein, spaced apart the length of the spool 114, plus the distance of a shuttle stroke. The stops 128 and 130 limit the travel of the spool 114 within the shuttle bore 122 to the shuttle stroke. Plugs 132 and 134 within the spool bore 120, proximate the spool ends 118, occlude the spool bore. Thus, when hydraulic pressure from the source of water is applied to the plug 132 by the opening of the control valve 32, the spool 14 will slide, or be hydraulically forced, toward the stop 130. Similarly, when hydraulic pressure is applied to the plug 134 by opening the control valve 34, the spool will slide, or be hydraulically forced, within the shuttle bore against the stop 128. Of course, the pressure on the plug 132 or 134 will be sufficient to discharge any water in the shuttle bore 122 near end 126 and 124 into the respective bypass line 42 or 44 past the bypass valves 46 or 48.

The spool 114 has sets of end apertures, 136 and 138, through the spool wall 116 between the ends 118 and 119 of the spool 114 and the plugs 132 and 134, respectively. The end aperture sets are appropriately positioned along the length of the spool 114 so that when the spool is abutted against either stop, the aperture set near the spool end opposite the abutted spool end will be aligned with the flow ports 88 or 90. Water will then be flowed from the source of water through the inlet port 36 or 38, the shuttle and spool bores, the end aperture set 136 or 138, and the flow port 88 or 90, respectively, into the appropriate power line 92 or 94.

Two spaced apart sets of mid apertures, 140 and 142, extend through the spool wall 116 at positions between the plugs 132 and 134. The preferred embodiment of the shuttle device has a single outlet port of the shuttle body and two mid aperture sets of the spool spaced the spool stroke apart. This structure is made feasible by spacing the mid apertures apart the spool stroke and spacing each end aperture set a spool stroke from the nearest mid aperture set.

As shown in FIGS. 2 and 3, when the spool is abutted against either of the stops 128 or 130, the mid aperture sets 140 and 142 are aligned with one of the flow ports. The flow ports are preferably spaced the shuttle stroke away from the outlet port so that the appropriate end aperture 136 or 138 will align with the flow port 88 or 90, respectively when the mid apertures are aligned with the flow port 90 or 88 and the outlet port.

The preferred structure described above may be modified to use two outlet ports, with more than two mid aperture sets, if necessary. Other modifications could utilize the alignment of apertures through the spool with ports, with the spool abutted against the stops in alternating positions, and still be within the scope of my invention.

The use of the term "apertures" is not used restrictively. For example, the plug could be placed at the very end of the spool, with the space outside the plugs functioning as the end aperture sets. As another example, a slot could connect the mid apertures, and still perform the same function as the holes shown in the drawings. However, for reliability of operation, the spool 114 described above is preferred.

As shown in FIGS. 1, 2, and 3, and I prefer to construct the shuttle device, and almost all of the spray system structure, of standard, commonly available, off-the-shelf polyvinyl chloride (PVC) pipe members and connectors. The shuttle body 40 is formed by joining together three PVC tees 146 and two four-way PVC connectors 148. The tees and connectors are joined together as shown in FIGS. 2 and 3 to form the shuttle body by boring out the threads at parts of the tees and inserting tightly fitting short sleeves 144 that are glued at the joints of the tees and couplers.

Thus, the inside diameter of the sleeves 144 determines the outside diameter of the spool 114 that may be used. The outside diameter of the spool must be such that slidable movement of the spool within the bore of the sleeves 144 is permitted. It may be seen in the figures that the sleeves 144 are short enough not to extend to the ports formed by the threaded couplings of the tees and four way couplers. The space between the shuttle bore and spool from port to port is sufficiently small to effectively block the bore at these joints. This leaves a flow chamber between the spool wall and the shuttle bore at each port.

The use of the PVC tubing makes the spool lightweight and easily moved by the hydraulic pressure. The stops 128 and 130 are preferably made of brass washers.

I prefer to use electrically actuated and commonly available PVC sprinkler valves for the control valves 32 and 34 and commonly available check valves modified to maintain a back pressure of about 15 PSI gauge for the bypass valves 46 and 48. In the event that any of these parts break, crack, or fail, the appropriate PVC fitting may be modified as described and installed at a minimum of expense and effort. Of course, it will be understood that a shuttle device and sprayer structure according to my invention could be made of other materials and have different construction, and still be within the scope of my invention.

The sprayer described above and in FIGS. 1, 2, and 3 operates as follows. Water flows from the source of water to the mix tank through the water inlet line. An operation cycle begins when the meter switches a first control valve, for this description valve 32, open. Then, the shuttle device operates to reverse the power fluid connections of the source to the mix tank and to the sides of the pump 84, thereby fluidly connecting the source of water to the side 98 and fluidly connecting the side 100 to the mix tank.

The operation of the shuttle device is as follows. The opening of the control valve 32 fluidly connects water under pressure from the source to the inlet port 36, pressurizing the shuttle bore between the inlet port 36 and the plug 132, thereby sliding the spool toward the stop 130 with the hydraulic pressure. Then, while the hydraulic pressure maintains the spool against the stop, the end apertures 136 are aligned with the flow port 88, the mid apertures 142 are aligned with the flow port 90, and the mid apertures 140 are aligned with the outlet port 52.

After the reversal of the power fluid connections by operation of the shuttle device as described above, water is flowed from the source to the pump side 98 through the shuttle device, thereby exerting pressure on the piston of the pump 84, thereby moving the piston or pressure member of the pump 84 a proportioning stroke. This stroke increases the volume of the chamber at the pump side 98, decreases the volume of the chamber at the pump side 100, and increases the volume of the concentrate side or chamber 106 of the pump 86. These changes in volume flow water from the pump side 100 through the shuttle device and into the mix tank, and withdraw concentrate from reservoir 104 through the check valve 110.

After the operation or movement of the piston through the proportioning stroke, water continues to flow thrugh the bypass valve 46 into the mix tank while the meter 24 continues to measure the amount of water flowed to the mix tank. When the meter has measured the flow of a unit amount of water since the last switching step described above, the meter switches current to the control valve 34, thereby opening the valve 34 and closing the valve 32. This change in pressure to the opposite end of the shuttle device operates the shuttle device to reverse the power fluid connections, thereby fluidly connecting the source to the pump side 100 and the pump side 98 to the mix tank.

The operation of the shuttle device described immediately above occurs as follows. The opening of the control valve 34 pressurizes the shuttle bore between the inlet port 38 and the plug 134, thereby hydraulically moving or sliding the spool through the shuttle bore against the stop 128. Pressure acting on the plug 134 maintains the spool against the stop 128, and aligns end aperture set 38 with flow port 90, aligns mid aperture set 140 with the flow port 88, and aligns the mid apertures 142 with the outlet port 52. It may be seen that this alignment of the apertures indeed reverses of the connections of the power lines 92 and 94 to the source and the mix tank.

After the operation of the shuttle device, water is flowed under pressure to the source of the pump side 100 causing the piston of the pump 84 to reciprocally move a reciprocal or reverse proportioning stroke, thereby increasing the volume of the chamber at the side 100, decreasing the volume of the chamber at the pump side 98, and decreasing the volume of the concentrate chamber 106. These changes in volume flow water from the pump side 98 to the mix tank, and flow concentrate from the pump side 106 into the mix tank.

After the movement of the piston the full reciprocal proportioning stroke, water continues to flow to the mix tank through the bypass valve 48, and the meter continues to measure the amount of water flowed to the mix tank. When the meter has measured the flow of a unit amount of water, the meter switches electrical current from the valve 34 to the valve 32, thereby closing the valve 34 and opening the valve 32. This switching begins anew the steps or operation cited above, which are repeated as long as desired.

It may be apparent that the functioning of the shuttle device may be stated independently from the operation of the spray system embodiment of FIG. 1, by characterizing the outlet line 50 and the water inlet line 20 leading to the mix tank as an outlet, and the power lines 92 and 94 as flow lines of a liquid flow system. Thus, the operations described above for the shuttle device may be combined to form a method for alternating fluid connections of the flow lines to the source while alternating the fluid connection of the other flow line to the outlet.

The proportioning system disclosed in FIG. 1 uses piston type pumps with the power and proportioning pump. An alternate embodiment of a proportioning system is shown in FIG. 4. Diaphragm barrel pumps 150 and 152 are each segregated into two chambers by pressure members, or diaphragms 154 and 156, respectively. A steel or plastic plate is connected to the diaphragm. Shafts 158 are attached to the plates of the diaphragms with threaded couplings. A shaft coupler 160 of semirigid material joins the two shafts 158 so that they stroke in unison. The semirigid coupler 160 permits minor twisting or bending of the shafts 159 during reciprocation of the pumps without damage or binding. The embodiment of FIG. 4 is assumed to be substituted for the proportioning system, with the same flow connections of the embodiment shown in FIG. 1.

The diaphragms 156 divide the pump 150 into chambers 162 and 164. The diaphragm 158 divides the pump 152 into chanbers 166 and 168. For this embodiment, the chambers 162 and 166 are fluidly connected to the power lines 92 and 94, respectively. The chambers 164 and 168 are preferably connected to concentrate lines 102 and 102' connecting the mix tank 22 with at least one reservoir of concentrate. For this embodiment, the line 102 is connected to the reservoir 104 and the mix tank 22, whereas the line 102' is connected to a different reservoir with different concentrate therein (not shown). Upstream check valves 170 and downstream check valves 172 in the concentrate lines 102 and 102' provide for pumping action when alternating water flow to the chambers 162 and 166 reciprocates the pressure members of the pumps 150 and 152. As an alternative, one of the chambers 164 or 168 could be vented to the atmosphere and the concentrate line 102' omitted as was done for the proportioning pump in the embodiment shown in FIG. 1.

Diaphragm pumps as described above may be most advantageously used in high volume low pressure flow, such as when pumping slurries. In connection with this use, the check valves 110 and 112, and 170 and 172, are preferably spring loaded.

The quantity of concentrate pumped during each stroke may be adjusted by adding or removing thin shim plates 174 between the pump body and the shaft coupler as shown in FIG. 4. The thickness of the shims determines stroke length, thereby changing the volumetric change of the chambers 164 and 168 during their reciprocation. The pump connections are also different for the exemplary diaphragm pump system, since each pump 150 or 152 acts as a motor for the other on one of the strokes of each reciprocation.

The operation of the spray system, with the diaphragm pump proportioning system replacing the piston-type pump system of FIG. 1, is substantially as follows. The control valve 32 is opened, operating the shuttle device as described above following the opening of valve 32. Hydraulic pressure is connected through the power line 92 to the chamber 162. The diaphragm, or pressure member 154, of the pump 150 moves the diaphragm 156 of the pump 152. The chamber 162 increases in volume, thereby decreasing the volume of the power chamber 166, decreasing the volume of the other concentrate chamber 164 and increasing the volume of the concentrate chamber 168. The suction produced by the volumetrically expanding chamber 168 withdraws an amount of concentrate from the reservoir 104, through the line 102, while the consequent reduction in volume of the chambrr 164 dispenses a previously withdrawn amount of concentrate into the mix tank through line 102'. At the same time, the decreased volume of the chamber 166 also forces water from the pump 152 through the power line 94 and the outlet line 52 to the mix tank.

After a half gallon, or other preselected unit amount of water, is flowed into the mix tank, the meter 24 switches the control valve 34 open and the valve 32 closed. The shuttle device operates as described above following the opening of the valve 34. Hydraulic pressure from the source is connected to the chamber 166. Water flows to the power chamber 166, increasing the volume of the chamber 166, and moving the pressure members or diaphragms a reciprocal proportioning stroke. The diaphragm movement decreases the volume of the chamber 168 while decreasing the volume of the power chamber 162 and increasing the volume of the chamber 164. The suction created by expansion of the concentrate chamber 164 withdraws an amount of concentrate from the other reservoir (not shown). The contraction of the concentrate chamber 168 dispenses concentrate into the mix tank. Water is forced or flowed from the power chamber 162 through the power line 92 and outlet into the mix tank.

Of course, a track mounting for one of the pumps 150 or 152, and a calibration scale and pointer, similar to that disclosed in connection with the embodiment shown in FIG. 1 could be used for the proportioning system shown in FIG. 4. However, the preferred method of calibration is to use standardized shim plates 174, with the number of shim plates varying according to the desired amount of concentrate to be withdrawn.

It may be seen that because of the dual pumping action with two chambers of the pumps connected to the reservoirs and mix tank, an amount of concentrate is dispensed into the mix tank for each unit amount of flow. This is different from the embodiment of FIG. 1, where an amount of concentrate was dispensed for each two unit amounts of flow. As previously discussed, this dual pumping action could also be used in connection with the embodiment shown in FIG. 1. The proportioning pump side vented to the atmosphere could be connected to the mix tank and another reservoir. For embodiments employing the dual pumping feature, the amount of concentrate withdrawn for each stroke would be adjusted so that the proportion of concentrate withdrawn for each stroke would be in the desired mixture proportion to a single unit volume of water flowed, or in other words, so that the total concentrate dispensed per cycle or reciprocation would be in the desired mixture proportion to two unit amounts of water.

By comparing the teaching for the piston and diaphragm proportioning systems, it may be seen that the two power chambers may be selected from any of the four available pump chambers, so long as alternating hydraulic pressure connections to the selected chambers, and the structural connection of the pressure members, will reciprocate the connected pressure members.

FIG. 5 shows a preferred connection of the reservoirs to the concentrate line 102 leading to the mix tank. Reservoir 180 and reservoir 182 may contain the same or different concentrates. Water supply connection 184 is preferably a branch line from the water inlet line 20. The triangles in FIG. 5 represent quick disconnect and connect couplings. The standard proportioning pump set with the check valves previously shown in FIG. 1 are duplicated in FIG. 5.

The concentrate line 102 upstream of the pump 86 is preferably made of flexible hose (shown by a "wavy" line) with reservoir disconnect 183 to permit quick disconnection from one reservoir and connection to another reservoir, or connection to the water supply at water branch connection 184. The concentrate line is also preferably disconnectable from the mix tank at tank connection 186.

If it is determined that a different concentrate needs to be sprayed, as where a spraying activity involves more than one pesticide, herbicide, fertilizer, etc., the concentrate line may be disconnected from the reservoir 180 and connected to the water supply connection 184, so that water is withdrawn into the proportioning pump chamber, thereby rinsing the chamber and lines of the previously used concentrate and mixture.

The water flow and proportioning system would be stopped, and the mixture remaining in the mix tank would then be withdrawn and sprayed. The reservoir 182 with concentrate could then be connected to the concentrate line, the water flow and proportioning system started, and mixing and spraying operations continued with the new mixture.

Of course, the quick connectors also facilitate switching to the reservoir 182 when the concentrate in the reservoir 180 is exhausted.

The tank connection 186 also permits accurate calibration of the proportioning stroke settings of the scale 111 and pointer 113, or if such selector means are not used, accurate selection of the actual amount dispensed through the line 102 during a single reciprocation. The concentrate line is connected to a reservoir with concentrate therein, and the spray system is operated for one cycle or stroke to dispense the withdrawn amount of concentrate into a measuring container, such as graduated cylinder 188, shown in FIG. 5. By measuring the actual amount dispensed for each reciprocation of the proportioning pump, the pointer 113 and volumetric scale 111, or the shims 174, could be carefully set or constructed to permit easy and quick preselections of the dispensed amount of concentrate.

FIG. 6 discloses a schematic diagram of an electrical control circuit for a sprayer system according to my invention. The control circuit uses a level control that is different from that disclosed in FIG. 1. The level control in FIG. 1 uses the position of the float to open or close a valve in the water inlet line 20. The embodiment shown in FIG. 6 uses a level switch 198 of the float device 56 to interrupt the circuit connecting current to the control valves.

The electrical control circuit shown in FIG. 6 includes a source of electrical power 190 connected to fuse 192 by power wire 191. Three way toggle switch 194, has a pair of center taps 193, and pairs of end taps 195 and 196. The taps 195 and 196 are cross-connected as shown in FIG. 6. To open the valves 32 or 34, the meter 24 receives electrical current from the power source 190 through the power wire 191. The meter switches current from one the control wires 199 and 199' connected to the center taps 193 of the toggle switch 194, to the other wire 199 or 199'. The control valves 32 and 34 are each connected to one of the pair of end taps 196 by the control wires 199 and 199'.

The three positions of the toggle switch 194 represent a center off position, a test position with the switches cross connected to the meter, and an on position. Moving the switch to the test position immediately reverses the control valve positions, which operates the shuttle device. The operability of the different parts of the spray system may then be determined based on what does not happen when the switch is moved to the test position. The control valves are both electrically connected by level switch wire 197 to the level switch 198. The level switch 198 is connected to the power source 190 by the level switch wire 197 to complete the circuit. This electrical circuit is simple, and especially adaptable to use with a 12 volt DC power source, since my spray system is preferably mounted on a vehicle.

FIG. 7 schematically discloses another preferred embodiment of my invention using multiple concentrate sources or reservoirs dispensed simultaneously into the mix tank. Hose 200, hose reel 202, and water inlet line 204 form a water connector to a source of water under pressure (not shown). The water inlet line 204 connects the source through the water connector to the mix tank 206 through meter 208 and smart box 210. The smart box 210 preferably includes the shuttle structure shown in FIG. 1, such as the control lines, control valves, shuttle device, bypass lines and valves, outlet line, and flow ports, as well as the control circuit disclosed in connection with FIG. 6.

Inlet check valve 212 between the meter and the hose reel in the inlet line 204 prevents back flow of water from the proportioning system, shuttle structure, meter or mix tank into the source of water thereby preventing the possibility of contamination of the source, or siphoning of water from the system when the water input connection is disconnected from the source. Strainer 214 downstream of the check valve 212 removes particles or other contaminates sufficiently large to affect the operation of the shuttle structure, valves, etc.

Vent line 216 is connected to the water inlet line 204 downstream of the strainer, and has check valve 218 and vent valve 220 therein to permit venting of pressure from the water inlet line. The vent line 216 also permits bleeding of air from the lines, or the release of pressure in the event a problem occurs. A control valve between the strainer and the meter provides a convenient means of disconnecting the meter and sprayer system downstream of the valve 222 from the pressure of the water source.

Electrical connections of the meter to the control valve are shown as a dotted line between the meter and the smart box. An electrical power input (not shown) would also be supplied to the smart box for powering of the electrical control system. Likewise a dotted line between level control 224 identifies the electrical connection between the level control switch 198 connected to a float of the level control for disconnecting or connecting current from both of the control valves of the smart box 210.

Power lines 226 and 228 are connected to the flow ports of the shuttle device of the smart box. The meter switches the connection of the source of water under pressure between the power lines 226 and 228 on a per unit amount of water flowed basis as described previously in connection with the other embodiments. The difference for this embodiment is that the power lines 226 and 228 each extend to either side of three pumps 230, 232, and 234 of three proportioning pump sets similar to the pump set of FIG. 1. The reciprocation of the pumps will be synchronized because the switching of pressure between the power lines 226 and 228 will be the same for each pump. However, the adjustable stroke of the pumps permits variations between the amount of concentrate withdrawn by pumps 236, 238, 240 of the pump sets, semirigidly connected to the pumps 230, 232, and 234 respectively.

One side or chamber of each pump 236, 238, and 240 is connected by concentrate lines 250 to reservoirs 242, 244, and 246, respectively. Each reciprocation of the pump sets will withdraw and dispense a separate preselected amount of concentrate for each pump set from the reservoirs 242, 244, and 246 each time two unit amounts of water are flowed.

Concentrate check valves 248 in the concentrate lines 250 from the reservoirs to the mix tank prevent back flow into the tank and proportioning pump in the event that one or more of the power pumps are isolated from pressure by closing the control valves 252 in the connections of each of the power pumps 230, 232, and 234 to the power lines 226 and 228.

The mix tank 206 is fluidly connected to high pressure pump 254 by tank line 256. Strainer 258 in the tank line removes large particles that might damage or hinder the operation of the high pressure pump 254. Spray line 260 fluidly connects the outlet of the pump 254 to hose reel 262 and to sprayer hose 264. A spray gun at the end of the spray gun (not shown) at the end of the sprayer hose 264 discharges the mixture withdrawn by the pump under high pressure.

Recycle line 266 fluidly connects the outlet of the high pressure pump 254 with the mix tank for flowing or recycling a portion of the mixture withdrawn by the high pressure pump 254 into the mix tank and discharging it under high pressure to agitate the mixture. Recycle disconnect 268 in the recycle line 266 permits disconnection of the high pressure mixture from the mix tank when agitation is not required.

The operation of the three parallel connected proportioning systems with the same shuttle structure permits synchronous dispensing of different concentrates into the mixing tank on a unit amount of water flowed basis, while retaining the flexibility of adjusting the stroke of each proportioning system to dispense different preselected amounts of each concentrate and other benefits noted above for the single proportioning system embodiment of FIG. 1.

The embodiment shown and described above is only exemplary. I do not claim to have invented all the parts, elements or steps described. Various modifications can be made in the construction, material, arrangement, and operation, and still be within the scope of my invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| Catalog of Elements | | | |
|---|---|---|---|
| 10 | faucet | 136 | end aperture set |
| 12 | house | 138 | end aperture set |
| 13 | sprayer system | 140 | mid aperture set |
| 14 | hose reel | 142 | mid aperture set |
| 16 | hose | 144 | sleeves |
| 18 | faucet connector | 146 | tee connectors |
| 20 | water input line | 148 | four way connectors |
| 22 | mix tank | 150 | diaphragm pump |
| 24 | meter | 152 | diaphragm pump |
| 26 | shuttle structure | 154 | diaphragm |
| 28 | control line | 156 | diaphragm |
| 30 | control line | 158 | shafts |
| 32 | control valve | 160 | shaft coupler |
| 34 | control valve | 162 | chamber |
| 36 | inlet port | 164 | chamber |
| 37 | bypass port | 166 | chamber |
| 38 | inlet port | 168 | chamber |
| 39 | bypass port | 170 | upstream check valves |
| 40 | shuttle body | 172 | downstream check valves |
| 42 | bypass line | 174 | shim plates |
| 44 | bypass line | 180 | reservoir |
| 46 | bypass valve | 182 | reservoir |
| 48 | bypass valve | 183 | reservoir disconnect |
| 50 | outlet port | 184 | water supply connection |
| 52 | outlet port | 186 | tank connection |
| 54 | level control | 188 | graduated cylinder |
| 56 | float | 190 | power source |
| 58 | level valve | 191 | power wires |
| 60 | high pressure pump | 192 | fuse |
| 62 | pump inlet | 193 | toggle switch |
| 64 | tank outlet line | 194 | center tap pair |

-continued

| Catalog of Elements | | | |
|---|---|---|---|
| 66 | nozzle | 195 | end top pair |
| 67 | tree | 196 | end top pair |
| 68 | spray gun | 197 | switch wire |
| 70 | pump outlet | 198 | level switch |
| 72 | gun line | 199 | control wire |
| 74 | hose reel | 199' | control wire |
| 76 | gun hose | 200 | hose |
| 78 | recycle line | 202 | hose reel |
| 80 | recycle disconnect | 204 | water inlet line |
| 82 | pressure relief valve | 206 | mix tank |
| 84 | piston pump | 208 | water |
| 86 | piston pump | 210 | smart box |
| 88 | flow port | 212 | inlet check valve |
| 90 | flow port | 214 | strainer |
| 92 | power line | 216 | vent line |
| 94 | power line | 218 | check valve |
| 95 | shafts | 220 | vent valve |
| 96 | shaft coupler | 222 | valve |
| 98 | pump side | 224 | level control |
| 100 | pump side | 226 | power line |
| 102 | concentrate line | 228 | power line |
| 102' | concentrate line | 230 | power pump |
| 104 | concentrate reservoir | 232 | power pump |
| 106 | pump side | 234 | power pump |
| 108 | pump side | 236 | proportioning pump |
| 109 | vent | 238 | proportioning pump |
| 110 | upstream check valve | 240 | proportioning pump |
| 111 | volumetric scale | 242 | reservoir |
| 112 | downstream check valve | 244 | reservoir |
| 113 | pointer | 246 | reservoir |
| 114 | spool | 248 | check valves |
| 116 | spool wall | 250 | concentrate lines |
| 118 | spool end | 252 | valves |
| 119 | spool end | 254 | high pressure pump |
| 120 | spool bore | 256 | tank line |
| 122 | shuttle bore | 258 | strainer |
| 124 | shuttle end | 260 | sprayer line |
| 126 | shuttle end | 262 | hose reel |
| 128 | stop | 264 | sprayer hose |
| 130 | stop | 266 | recycle line |
| 132 | plug | 268 | recycle disconnect |
| 134 | plug | | |

I claim as my invention:
1. A process for combining
   a. at least one concentrate and
   b. water wherein the improved method for combining the concentrate in a desired mixture proportion with water comprises the steps of:
   c. flowing water from a source of water under pressure to a mix tank through one of two control valves;
   d. switching one of the two control valves open and the other control valve closed, then
   e. operating by the control valves a shuttle device that reverses power fluid connection of the source and the mix tank to each of two power chambers of a set of two proportioning pumps, each pump having two chambers separated by a movable pressure member, with the pressure members operatively connected so that reciprocation of one member reciprocates the other member,
   f. fluidly connecting the source of water to one of the power chambers and
   g. fluidly connecting the other power chamber to the mix tank, then
   h. flowing water from the source of water under pressure to the one power chamber,
   i. moving the pressure members of the proportioning pump set a proportioning stroke with water pressure, while j. decreasing the volume of the other power chamber with the movement of the pressure members and k. flowing water from the other power chamber to the mix tank, l. increasing the volume of a concentrate chamber of the proportioning pump chambers with the movement of the pressure members and m. withdrawing a preselected amount of concentrate from a reservoir fluidly connected to the concentrate chamber, and n. measuring the amount of water flowed to the mix tank since the last switching step, then o. switching the other control valve open and the one control valve closed responsive to measuring the flow of a unit amount of water since the last switching step, p. operating the shuttle device to reverse the power fluid connections, q. fluidly connecting the source to the other power chamber, and r. fluidly connecting the one power chamber to the mix tank, then s. flowing water under pressure from the source to the other power chamber, t. moving the pressure members of the proportioning pump set a reverse proportioning stroke with the water pressure, while u. decreasing the volume of the one power chamber with the reverse movement of the pressure members and v. flowing water from the one power chamber to the mix tank, w. decreasing the volume of the concentrate chamber with the reverse movement of the pressure members and x. dispensing the withdrawn concentrate into the mix tank through a fluid connection of the concentrate chamber and the mix tank, and y. measuring the amount of water flowed to the mix tank since the last switching step, then z. switching the one control valve open responsive to measuring the flow of a unit amount of water since the last switching step, aa. repeating the operating step "e." through the switching step "z.", bb. the preselected amount of concentrate dispensed into the mix tank during each reciprocation of the pressure members being substantially in the same proportion to two of the measured unit amounts of flowed water as the desired mixture proportion, bb'. measuring the level of mixture in the mix tank, and bb". closing both control valves when the level of the mixture in the mix tank reaches a preselected maximum.

2. The invention as defined in claim 1 including all of the limitations a. through bb". with the addition of the following limitations:

cc. mixing the concentrate and water in the mix tank by dd. withdrawing the concentrate and water mixture from the mix tank, and ee. pressurizing the mixture with a high pressure pump, while ff. recycling part of the pressurized mixture to the mix tank, gg. discharging the recycled mixture into the mix tank under high pressure, thereby hh. agitating the water and concentrate in the mix tank;

ii. spraying the pressurized mixture.

3. The invention as defined in claim 1 including all of the limitations a. through bb". with the addition of the following limitations:

cc. said operating step "e." further including dd. fluidly connecting water under pressure from the source of water through the one control valve to an inlet port of a shuttle body with the inlet port fluidly connected to a shuttle bore of the shuttle body, ee. pressurizing the shuttle bore with water pressure between the inlet port and a plug, within and occluding a spool bore of a spool telescoped within the shuttle bore, ff. sliding the spool toward a stop in the shuttle bore, then gg. maintaining the spool against the stop with said source water pressure, while hh. aligning a set of end apertures through the spool wall adjacent a first end of the spool, between the plug and the inlet port, with one flow port of the shuttle bore fluidly connected to the one power chamber of the proportioning pump set, ii. aligning one set of at least two sets of mid apertures through the spool wall, on the side of the plug opposite the end aperture set, with an other flow port of the shuttle bore fluidly connected to the other power chamber of the proportioning pump set, jj. aligning a different set of mid apertures through the spool wall, opposite the plug from the end aperture set, with an outlet port of the shuttle bore fluidly connected to the mix tank;

kk. said operating step "p." further including ll. fluidly connecting water under pressure from the source through the second control valve to an opposite inlet port fluidly connected to the shuttle bore at an end thereof opposite the inlet port, mm. pressurizing the shuttle bore between the opposite inlet port and an opposite plug, within and occluding the spool bore between the mid aperture sets and a second end of the spool, with the water pressure, and nn. sliding the spool toward an opposite stop within the shuttle bore at an end thereof opposite the stop, then oo. maintaining the spool against the opposite stop with the source water pressure, while pp. aligning a set of opposite end apertures through the spool wall, between the opposite plug and the opposite inlet port, with the other flow port, qq. aligning one of the mid aperture sets through the spool wall between the plugs with the one flow port and rr. aligning a different mid aperture set through the spool wall, between the plugs with the outlet port.

4. A process including a. a source of water under pressure, b. an outlet, c. a liquid flow system having two flow lines;

wherein the method for alternating fluid connections of each flow line to the source while alternating the fluid connection of the other flow line to the outlet comprises the steps of:

d. fluidly connecting water under pressure from the source to an inlet port of a shuttle body, with the inlet port fluidly connected to a shuttle bore of the shuttle body, e. pressurizing the shuttle bore with water pressure between the inlet port and a plug, within and occluding a spool bore of a spool telescoped within the shuttle bore, f. sliding the spool toward a stop in the shuttle bore, then g. maintaining the spool against the stop with said source water pressure, while h. aligning a set of end apertures through the spool wall adjacent a first end of the spool, between the plug and the inlet port, with a flow port fluidly connecting one of the flow lines to the shuttle bore, i. aligning one set of at least two sets of mid apertures through the spool wall, on the side of the plug opposite the end aperture set, with an other flow port connecting the other flow line with the shuttle bore and j. aligning a different set of mid apertures through the spool wall, on the side of the plug opposite the end aperture set, with an outlet port fluidly connected to the outlet, then k. switching the fluid connection of the source of water from the inlet port to an opposite inlet port fluidly connected to the shuttle bore at an end thereof opposite the inlet port, l. pressurizing the shuttle bore between the opposite inlet port and an opposite plug, within and occluding the spool bore between the mid sets and a second end of the spool, with the water pressure, and m. sliding the spool toward an opposite stop within the shuttle bore at an end thereof opposite the stop, then n. maintaining the spool against the opposite stop with the source water pressure, while o. aligning a set of opposite end apertures through the spool wall, between the opposite plug and the opposite inlet port, with the other flow port, p. aligning one of the mid aperture sets through the spool wall between the plugs with the flow port and q. aligning a different mid aperture set through the spool wall, between the plugs, with the outlet port, then r. switching the fluid connection of the source from the opposite inlet port to the inlet port opposite the spool therefrom, s. repeating the pressurizing step "e." through the switching step "r."

5. The invention as defined in claim 4 including all of the limitations a. through s. with the addition of the following limitation:

t. aligning the same mid aperture sets in the aligning steps "q." and "p." as were aligned in the aligning steps "l." and "j.", respectively.

6. Structure for combining at least one concentrate in desired proportion with water comprising:

a. a water connector adapted to fluidly connect a source of water under pressure to a water inlet line, b. a concentrate reservoir, c. concentrate in the reservoir, d. a mix tank, e. the water inlet line connecting the water connector to the mix tank, f. a set of two proportioning pumps, g. each proportioning pump having two chambers separated by a pressure member, h. the pressure members being operatively connected so that reciprocation one pressure member reciprocates the other pressure member, i. two power chambers of the proportioning pump chambers providing for reciprocation of the pressure members when hydraulic pressure is alternated between the power chambers, j. a power line fluidly connecting each power chamber to k. one of two flow ports of a shuttle device, l. a concentrate line fluidly connecting the reservoir and the mix tank, m. a concentrate chamber of the proportioning pump chambers fluidly connected to the concentrate line such that concentrate is withdrawn and dispensed into the mix tank for each reciprocation of the pressure members, n. an outlet line connecting the shuttle device to the mix tank, o. a control valve in each of two control lines fluidly connecting ends of the shuttle device to the water inlet line, p. a meter connected to the water inlet line for measuring the amount of water flowed to the mix tank, q. the meter connected to the control valves, r. the meter switching the control valves causing one control valve to be switched from open to closed and the other control valve to be switched from closed to open responsive to measuring the flow of a preselected unit amount of water of the mix tank, s. the shuttle device fluidly connecting the hydraulic pressure from the source of water to one of the flow ports while connecting the other flow port to the outlet port, t. the shuttle device reversing the fluid connections of the flow ports to the source of water and the outlet port responsive to switching by the meter, u. the shuttle device further including v. a shuttle body having, w. two inlet ports at the ends of the shuttle device fluidly connected to the control lines x. the two flow ports spaced between the inlet ports, and y. an outlet port spaced between the flow ports and fluidly connected to the outlet line, z. a shuttle bore fluidly connected to each of the ports;

aa. the distance between each inlet port and one of the flow ports being substantially equal to a spool stroke;

bb. a shuttle spool having cc. a spool length, dd. spool ends, ee. a spool bore, and ff. a spool wall;

gg. the spool slidably telescoped within the shuttle bore, hh. stops in the shuttle bore for limiting the slidable travel of the spool in the shuttle bore, ii. the stops spaced apart a distance substantially equal to the sum of the lengths of the spool and the spool stroke, jj. two spaced apart plugs within and occluding the spool bore, kk. at least two sets of mid apertures through the spool wall, spaced apart between the plugs, ll. two sets of end apertures through the spool wall between the plugs and the spool ends, mm. each end aperture set being spaced apart a distance equal to the spool stroke from one of the mid aperture sets.

7. The invention as defined in claim 6 including all of the limitations a. through mm. with the addition of the following limitations:
   nn. a high pressure pump fluidly connected at its input end to the mix tank,
   oo. the high pressure pump being connected to a spray gun,
   pp. a recycle line fluidly connecting the output of the high pressure pump to the mix tank,
   qq. the pressure connected to the water connector being substantially lower than the pressure downstream of the high pressure pump.

8. The invention as defined in claim 6 including all of the limitations a. through mm. with the addition of the following limitations:
   nn. the remaining chamber of the proportioning pumps being an other concentrate chamber,
   oo. an other concentrate line connecting an other reservoir of concentrate with the mix tank,
   pp. the other concentrate chamber being fluidly connected to the other concentrate line such that concentrate is withdrawn and dispensed through the other concentrate line to the mix tank line, for each reciprocation of the proportioning pump pressure members.

9. The invention as defined in claim 6 including all of the following limitations a. through mm. with the addition of the following limitations:
   nn. at least two of the proportioning pump sets, having their power lines connected in parallel to the two flow ports of the shuttle device,
   oo. the concentrate chambers of the proportioning pump sets being fluidly connected to at least two concentrate reservoirs.

10. The invention as defined in claim 6 including all of the limitations a. through mm. with the addition of the following limitations:
    nn. the control valves being electrically opened, normally closed valves,
    oo. the meter being electrically connected to the control valves,
    pp. the meter switching the control valves open and closed by disconnecting electrical current from the open control valve and connecting electrical current to the closed control valve.

11. The invention as defined in claim 6 including all of the limitations a. through mm. with the addition of the following limitations:
    nn. the mid aperture sets aligned with the outlet port and one of the flow ports, and one of the end aperture sets aligned with the other flow port, when the spool is abutted against either of the stops, and
    oo. adjacent aperture sets being spaced apart a distance along the spool equal to the spool stroke,
    pp. adjacent ports being spaced apart a distance along the shuttle body equal to the spool stroke,
    qq. there being only two of the mid aperture sets,
    rr. there being only one outlet port.

12. The invention as defined in claim 6 including all of the following limitations a. through mm. with the addition of the following limitations:
    nn. adjustment means connected to the proportioning pump set for adjusting a proportioning stroke of at least one of the pressure members,
    oo. selector means on the proportioning pump set for preselecting the proportioning stroke to dispense a preselected amount of concentrate into the mix tank for each reciprocation of the pressure members,
    pp. said preselected amount of concentrate being in the desired mixture proportioning to two of the unit amounts of water.

13. Structure having
    a. a source of water under pressure,
    b. an outlet,
    c. a water flow system having two power lines;
    wherein the structure for alternating fluid connection of each power line to the source while alternating fluid connection of the other power line to the outlet comprises:
    d. a shuttle body having,
    e. two inlet ports at ends of the shuttle body,
    f. two flow ports between the inlet ports, and
    g. at least one outlet port between the flow ports;
    h. a shuttle bore fluidly connected to each port,
    i. the distance between each inlet port and the nearest flow port being substantially equal to a spool stroke;
    j. a shuttle spool having
    k. a spool length,
    l. spool ends,
    m. a spool bore, and
    n. a spool wall;
    o. the spool slidably telescoped within the shuttle bore,
    p. stops in the shuttle bore for limiting the slidable travel of the spool in the shuttle bore,
    q. the stops spaced apart a distance substantially equal to the sum of the lengths of the spool and the spool stroke,
    r. a control line fluidly connecting each inlet port with the source of water,
    s. at least one control valve in each control line for connecting water pressure from the source to each inlet port,
    t. each of the flow ports fluidly connected through one of the power lines to the water flow system,
    u. the outlet port fluidly connected to the outlet,
    v. two spaced apart plugs within and occluding the spool bore,
    w. at least two sets of mid apertures through the spool wall, spaced apart between the plugs,
    x. two sets of end apertures through the spool wall between the plugs and the spool ends,
    y. each end aperture set being spaced apart a distance equal to the spool stroke from one of the mid aperture sets,
    z. water flow through the shuttle bore between the spool and shuttle body being substantially blocked between ports.

14. The invention as defined in claim 13 including all of the limitations a. through z. with the addition of the following limitations:
    aa. the mid aperture sets aligned with the outlet port and one of the flow ports when the spool is abutted against either of the stops, and
    bb. one of the end aperture sets aligned with the flow port not aligned with one of the mid aperture sets when the spool is abutted against either of the stops.

15. The invention as defined in claim 13 including all of the limitations a. through z. with the addition of the following limitations:
   aa. adjacent aperture sets being spaced apart along the spool a distance equal to the spool stroke, and
   bb. adjacent ports being spaced apart along the shuttle body a distance equal to the spool stroke.

16. The invention as defined in claim 13 including all of the limitations a. through z. with the addition of the following limitations:
   aa. there being only two of the mid apertures sets,
   bb. there being only one outlet port.

17. A process for combining
   a. at least one concentrate and
   b. water
wherein the improved method for combining the concentrate in a desired mixture proportion with water comprises the steps of:
   c. flowing water from a source of water under pressure to a mix tank through one of two control valves;
   d. switching one of the two control valves open and the other control valve closed, then
   e. operating by the control valves a shuttle device that reverses power fluid connection of the source and the mix tank to each of two power chambers of a set of two proportioning pumps, each pump having two chambers separated by a movable pressure member, with the pressure members operatively connected so that reciprocation of one member reciprocates the other member,
   f. fluidly connecting the source of water to one of the power chambers and
   g. fluidly connecting the other power chamber to the mix tank, then
   h. flowing water from the source of water under pressure to the one power chamber,
   i. moving the pressure members of the proportioning pump set a proportioning stroke with water pressure, while
   j. decreasing the volume of the other power chamber with the movement of the pressure members and
   k. flowing water from the other power chamber to the mix tank,
   l. increasing the volume of a concentrate chamber of the proportioning pump chambers with the movement of the pressure members and
   m. withdrawing a preselected amount of concentrate from a reservoir fluidly connected to the concentrate chamber, and
   n. measuring the amount of water flowed to the mix tank since the last switching step, then
   o. switching the other control valve open and the one control valve closed responsive to measuring the flow of a unit amount of water since the last switching step,
   p. operating the shuttle device to reverse the power fluid connections,
   q. fluidly connecting the source to the other power chamber, and
   r. fluidly connecting the one power chamber to the mix tank, then
   s. flowing water under pressure from the source to the other power chamber,
   t. moving the pressure members of the proportioning pump set a reverse proportioning stroke with the water pressure, while
   u. decreasing the volume of the one power chamber with the reverse movement of the pressure members and
   v. flowing water from the one power chamber to the mix tank,
   w. decreasing the volume of the concentrate chamber with the reverse movement of the pressure members and
   x. dispensing the withdrawn concentrate into the mix tank through a fluid connection of the concentrate chamber and the mix tank, and
   y. measuring the amount of water flowed to the mix tank since the last switching step, then
   z. switching the one control valve open responsive to measuring the flow of a unit amount of water since the last switching step,
   aa. repeating the operating step "e." through the switching step "z.",
   bb. the preselected amount of concentrate dispensed into the mix tank during each reciprocation of the pressure members being substantially in the same proportion to two of the measured unit amounts of flowed water as the desired mixture proportion,
   cc. said operating step "e." further including
   dd. fluidly connecting water under pressure from the source of water through the one control valve to an inlet port of a shuttle body with the inlet port fluidly connected to a shuttle bore of the shuttle body,
   ee. pressurizing the shuttle bore with water pressure between the inlet port and a plug, within and occluding a spool bore of a spool telescoped within the shuttle bore,
   ff. sliding the spool toward a stop in the shuttle bore, then
   gg. maintaining the spool against the stop with said source water pressure, while
   hh. aligning a set of end apertures through the spool wall adjacent a first end of the spool, between the plug and the inlet port, with one flow port of the shuttle bore fluidly connected to the one power chamber of the proportioning pump set,
   ii. aligning one set of at least two sets of mid apertures through the spool wall, on the side of the plug opposite the end aperture set, with an other flow port of the shuttle bore fluidly connected to the other power chamber of the proportioning pump set,
   jj. aligning a different set of mid apertures through the spool wall, opposite the plug from the end aperture set, with an outlet port of the shuttle bore fluidly connected to the mix tank;
   kk. said operating step "p." further including
   ll. fluidly connecting water under pressure from the source through the second control valve to an opposite inlet port fluidly connected to the shuttle bore at an end thereof opposite the inlet port,
   mm. pressurizing the shuttle bore between the opposite inlet port and an opposite plug, within and occluding the spool bore between the mid aperture sets and a second end of the spool, with the water pressure, and
   nn. sliding the spool toward an opposite stop within the shuttle bore at an end thereof opposite the stop, then
   oo. maintaining the spool against the opposite stop with the source water pressure, while
   pp. aligning a set of opposite end apertures through the spool wall, between the opposite plug and the opposite inlet port, with the other flow port,
   qq. aligning one of the mid aperture sets through the spool wall between the plugs with the one flow port and
   rr. aligning a different mid aperture set through the spool wall, between the plugs with the outlet port.

* * * * *